(12) United States Patent
Taeger et al.

(10) Patent No.: US 6,724,899 B1
(45) Date of Patent: Apr. 20, 2004

(54) SOUND PICK-UP AND REPRODUCTION SYSTEM FOR REDUCING AN ECHO RESULTING FROM ACOUSTIC COUPLING BETWEEN A SOUND PICK-UP AND A SOUND REPRODUCTION DEVICE

(75) Inventors: Wolfgang Taeger, Lannion (FR); Gregoire Le Tourneur, Saint Quay-Perros (FR)

(73) Assignee: France Telecom S.A., Paris (FR)

( * ) Notice: Subject to any disclaimer, the term of this patent is extended or adjusted under 35 U.S.C. 154(b) by 0 days.

(21) Appl. No.: 09/429,366

(22) Filed: Oct. 28, 1999

(30) Foreign Application Priority Data

Oct. 28, 1998 (FR) .............................. 98 13838
Nov. 13, 1998 (FR) .............................. 98 14321

(51) Int. Cl.$^7$ .............................................. H04R 27/00
(52) U.S. Cl. .................. 381/83; 381/71.12; 379/406.01
(58) Field of Search ................. 381/66.83, 93, 381/71.11, 71.12, 76.12; 379/406.01, 406.06, 406.08, 420.07, 420.03

(56) References Cited

U.S. PATENT DOCUMENTS 4,649,505 A * 3/1987 Zinser, Jr. et al. .......... 379/411
5,121,426 A   6/1992 Baumhauer, Jr. et al.
5,323,458 A   6/1994 Park et al.
5,796,819 A * 8/1998 Romesburg ................ 379/406

FOREIGN PATENT DOCUMENTS

JP          01012648    *   1/1989
JP          01029096    *   1/1989

* cited by examiner

Primary Examiner—Duc Nguyen
Assistant Examiner—Lun-See Lao
(74) Attorney, Agent, or Firm—Lowe Hauptman Gilman & Berner, LLP

(57) ABSTRACT

A sound pick-up and reproduction system includes at least two sound sensors, such as microphones, situated at different distances from a sound reproduction device, such as a loudspeaker. A processor responds to amplitudes and phases of signals outputted by the at least two sound sensors to control a signal outputted to an amplifier and adapted to drive the sound reproduction device, thereby reducing echoes in the sound reproduction device output caused by acoustic coupling between the at least two sound sensors and the sound reproduction device.

5 Claims, 4 Drawing Sheets

SOUND PICK-UP AND REPRODUCTION SYSTEM FOR REDUCING AN ECHO RESULTING FROM ACOUSTIC COUPLING BETWEEN A SOUND PICK-UP AND A SOUND REPRODUCTION DEVICE

BACKGROUND OF THE INVENTION

1. Field of the Invention

The present invention relates to a sound pick-up and reproduction system provided with a device for reducing the echo resulting from the acoustic coupling between its sound pick-up and its reproduction device.

An acoustic system according to an embodiment of the present invention can, for example, be a system for picking up and reproducing sound consisting of a sound pick-up for picking up sound, such as a microphone, a reproduction device for reproducing the sound, such as a loudspeaker, and an application unit, such as an amplifier, to increase the power thereof in order to transmit it to the reproduction device.

It can also be a telephone unit also including a sound pickup for picking up sound such as a microphone, an application unit which will send the signal originating from the sound pickup to a distant telephone unit and a reproduction device provided for reproducing the signal originating from the distant unit.

In such systems, the signal emitted by the reproduction device can be picked up by the sound pickup, and an acoustic echo results therefrom. This acoustic echo can be broken down into two main parts: the loudspeaker/microphone direct coupling and the response of the room.

2. Description of the Related Art

Although the response of a room is in general dealt with effectively by conventional echo cancelling techniques (on account, among other things, of the fairly low level of this part of the echo), the same does not apply for the direct coupling, which results both from the acoustic mode and from propagation of the vibrations, for example through the case if the system is a telephone terminal. This part of the echo due to the direct coupling has in general a higher power than the local speech picked up by the sound pick-up (by 6 to 18 dB, that is a multiplying coefficient of 8), and brings about a self-oscillation phenomenon generally referred to as the "Larsen effect" if no suitable processing is applied.

Although echo cancelling makes it possible to deal with this harmful effect to a greater or lesser degree, a consequent variation in gain must be introduced in addition in order to avoid onset of the Larsen effect during the convergence phase of the echo canceller, and also later to prevent any problem if the echo path varies or in times of duplex speech.

For a telephone terminal, the direct acoustic coupling is large inasmuch as the microphone is placed in the same case as the loudspeaker. The echo which results from this coupling is the major obstacle to good operation of hands-free telephones.

It has therefore been sought to reduce the effects of the direct coupling. The microphone/loudspeaker distance cannot be changed in significant proportions in view of the size of the individual terminals. It should be noted however that, each time the distance is doubled, the power of the echo is divided by four.

It is on the other hand possible to act on the mechanics of the coupling between the loudspeaker and the microphone. For example, the microphone can be dissociated from the case using antivibratory materials, such as foams or rubber, which has the effect of removing or greatly decreasing the vibrations generated by the loudspeaker and transmitted, via the case, to the microphone.

This mechanical decoupling solution effectively decreases the vibrational coupling, but proves to be an industrially expensive solution. Furthermore, it does not reduce the acoustic coupling which can prove to be significant if the microphone is placed relatively close to the loudspeaker, which is the tendency today on account of the fashion for small-sized terminals.

Another known solution consists of using, in parallel with the echo signal path, a compensating filter whose response is the inverse of the pulse response of the coupling between the microphone and the loudspeaker, a coupling both mechanical and acoustic. In theory, at the output of the compensating filter, the signal coming from the loudspeaker due to the echo is nullified. However, in practice, this technique is fairly specialized and no longer gives satisfaction if the coupling has changed in its characteristics, even in a trivial way, following, for example, disassembly/reassembly of the terminal. This technique is furthermore not suitable if the nature of the perturbations is not linear, that is to say if they cannot be modelled by the product of the signal coming from the loudspeaker and a linear function. What is more, the operation of transducers is seldom linear, since they are generally subject to distortions and/or saturations, which are typical examples of non-linear functions.

Finally, for mass-production, the coupling will inevitably be different from one terminal to another, on account for example of the use of a slightly different loudspeaker or microphone, there again making this filter compensation technique not very effective.

SUMMARY OF THE INVENTION

The aim of the present invention is therefore to propose an acoustic system provided for reducing the echo which results from the direct acoustic coupling between its sound pick-up and its reproduction device which makes it possible to solve the problems mentioned above.

To that end, a sound pick-up and reproduction system according to an embodiment of the present invention includes the sound pick-up having at least two sound sensors situated at different distances from the reproduction device and a processing unit provided for using the amplitude and phase of the signals originating from each sound sensor in order to deliver a signal to the application unit whose echo signal has been reduced.

According to another aspect of the present invention, the processing unit performs filtering of the signal originating from each sensor, and then a summation of the signals thus filtered, the pulse response of each filtering associated with a sensor being defined by a function $g_i(t)$ which is a solution of the following equation:

$$\Sigma[h_i(t)]^* \, g_i(t)]N \; 0 \text{ for i varying from 1 to n}$$

where $h_i(t)$ (i varying from 1 to n) is the pulse response of each sensor to the signals delivered by the reproduction device.

According to another aspect of the present invention, one of the filterings is defined by a multiplication function.

According to another aspect of the present invention, the pulse response of each sensor to the signals delivered by the reproduction device is determined by measuring the response of the said sensor to signals emitted by the reproduction device.

According to another characteristic of the present invention, each function $g_i(t)$ is determined by solving the said equation by means of an adaptive algorithm.

According to a variant embodiment of the present invention, each function $g_i(t)$ is determined by solving the equation with a mean square algorithm.

According to another aspect of the present invention, the system has two sensors, one of which is closer to the reproduction device than the other.

According to another aspect of the present invention, the filtering associated with the sensor which is the further from the reproduction device is defined by a multiplication function.

BRIEF DESCRIPTION OF THE DRAWINGS

The characteristics of the invention mentioned above, as well as others, will emerge more clearly from a reading of the following description of an example embodiment, the said description being produced with reference to the accompanying drawings, among which.

DETAILED DESCRIPTION

Figure 1:
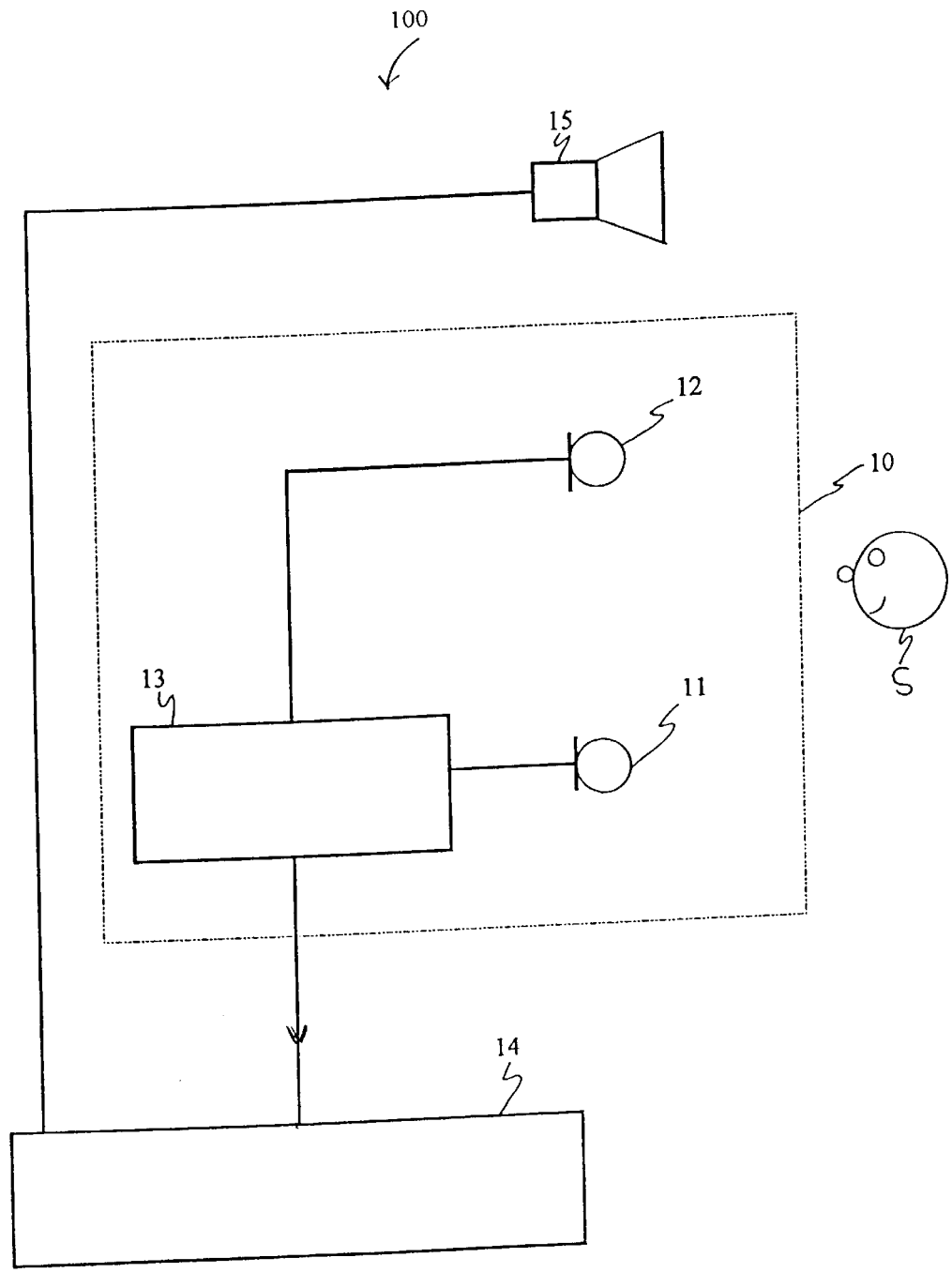
FIG. 1 is a block diagram of a sound pick-up of a system according to an embodiment of the invention.

FIG. 1 depicts a sound pick-up and reproduction system 100 whose sound pick-up 10 includes two sound sensors 11 and 12, here comprised of microphones, respectively connected to two inputs of a processing unit 13. The unit 13 has its output connected to an input of an application unit 14, for example, an amplifier or a telephone unit. The system 100 also has a sound reproduction device 15, here a loudspeaker, connected to the output of the telephone unit 14. FIG. 1 also depicts a sound source S.

The microphone 11 is the main microphone which receives the useful signal denoted s(t).

The sound signals emitted by the source S are picked up by the microphones 11 and 12 then delivering electrical signals which are next processed in the unit 13 before being transmitted to the application unit 14. The latter is, for example, an amplifier which will increase the power of the signals received from the unit 13 and deliver them to the loudspeaker 15 for reproduction purposes. It can also be a telephone unit which, on the one hand, will send these signals by a telephone channel to one or more other subscribers and, on the other hand, will increase their power and deliver them to the loudspeaker 15 for reproduction purposes.

According to one aspect of the present invention, the two microphones 11 and 12 are at different distances from the loudspeaker 15, the microphone 12 being situated closer than the microphone 11. As will be seen subsequently, the other geometric specifications, such as rotational symmetry, are not relevant to the present invention.

According to the present invention, it is the phase and amplitude information for the signals originating from the microphones 11 and 12 which are processed in the processing unit 13.

According to a first embodiment of the present invention, this processing corresponds to a combination of these signals with a delaying of the second signal originating from the microphone 12, which is closer to the loudspeaker 15, with respect to the first signal originating from the main microphone 11. This delay, denoted $t_e$, corresponds to the time of propagation between the two microphones 11 and 12 of the echo signal originating from the loudspeaker 15. It is demonstrated below that such a combination makes it possible to reduce the acoustic echo resulting from the coupling between the main microphone 11 and the loudspeaker 15.

There will now be considered the signal x1(t) at the output of the main microphone 11, which is the further from the loudspeaker 15, $x_2(t)$ the signal at the output of the microphone 12, which is therefore the closer, and y(t) the signal at the output of the processing unit 13 after processing of the two signals $x_i(t)$ and $x_2(t)$.

The processing unit 13 implements a processing of the two signals $x_1(t)$ and $x_2(t_2)$ respectively originating from the microphones 11 and 12 consisting of applying, to the signal originating from the microphone 12, a multiplying coefficient equal to the inverse of its attenuation oc~ with respect to that originating from the microphone 11 and a delay equal to the delay of the echo signal to with respect to the microphone 11 and summing with the signal originating from the microphone 11. This therefore gives:

$$y(t)=x_1(t)+1/a_e \cdot x_2(t-t_e) \qquad \text{Equation 1}$$

It will now also be considered, with regard to a simplification of the model, that the propagation is in a free field. If, moreover, the background noise in the room where the terminal 10 is situated as well as the electronic noise of the microphones 11 and 12 and of the loudspeaker 15 are neglected, the following relationship with regard to the microphone 11 can be written:

$$x_i(t)=s(t)+e(t) \qquad \text{Equation 2}$$

where s(t) is the signal originating from the sound source S (s(t) furthermore corresponds to the useful signal) and e(t) is the so-called echo signal originating from the loudspeaker 15.

With regard to the microphone 12, the signal originating from the source S is, in comparison with that received by the microphone 11, attenuated by a coefficient $a_s$ and delayed by a time ts. The echo signal originating from the loudspeaker 15, is attenuated by a coefficient $a_e$ and is in phase lead with respect to the signal received by the microphone 11 by the time te. The following can therefore be written:

$$x_2(t)=a_s s(t-t_s)+a_e e(t+t_e) \qquad \text{Equation 3}$$

For the requirements of the demonstration, it will be assumed that the source S is relatively distant from the microphones 11 and 12. It follows that the amplitudes of the useful signal at the two microphones 11 and 12 are substantially identical ($a_s=1$).

It should be noted that the microphone 12 is advantageously closer to the loudspeaker 15 than the microphone 11. The result of this is that the amplitude of the echo signal at the microphone 12 is greater than that at the microphone 11 and that the coefficient ae is greater than 1.

The signal at the output of the processing unit 13 can therefore be written:

$$y(t) = x_1(t) - \frac{1}{\alpha_e} x_2(t - t_e) = s(t) - \frac{1}{\alpha_e} s(t - t_s - t_e) \quad \text{Equation 4}$$

On account of the coefficient ae being greater than one, the signal at the output of the unit 13 is close to the useful signal s(t).

It should also be noted that the same would apply if the difference in delay $t_e$ at the microphones 11 and 12 of the echo signal is substantially equal to the difference in delay $t_s$ at the microphones 11 and 12 of the source S.

Figure 2:
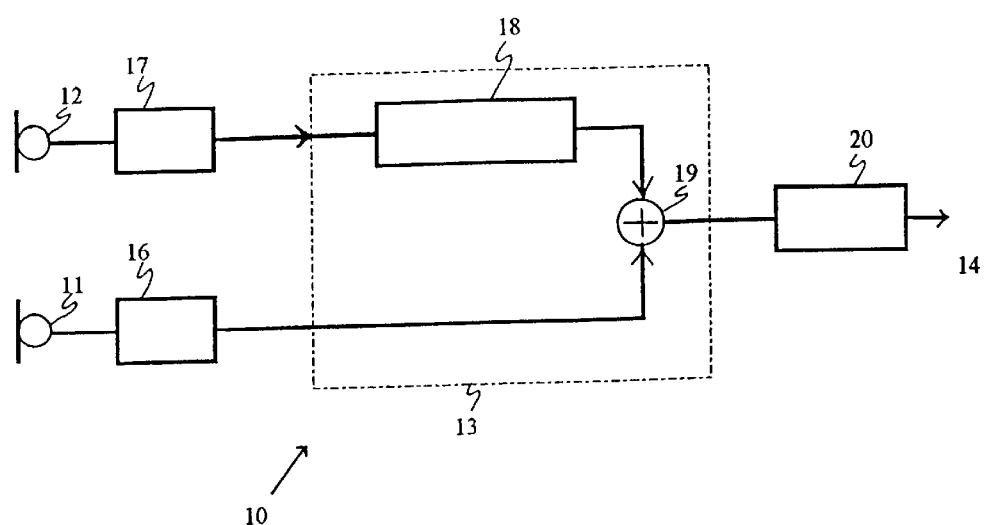
FIG. 2 is another block diagram of a sound pick-up according to the present invention, in a first embodiment of the filtering function.

There is now described a second embodiment of a sound pick-up 10 according to the invention with reference to FIG. 2 which is a block diagram thereof having the same elements as those of the system depicted in FIG. 1. Each microphone 11, 12 is connected to the input of an analog digital converter 16, 17. The digital signal originating from the converter 17 is delivered to the input of a filter 18 whose pulse response is described by a function g(t). The signals originating, on the one hand, from the converter 16 and, on the other hand, from the filter 18 are delivered to the input of a summer 19 whose output is connected to the input of a digital/analog converter 20. The signal at the output of the converter 20 is delivered to the application unit 14. It should be noted that the unit 13. here incorporates the functions of the filter 18 as well as that of the summer 19.

It should be understood that, if microphones 11 and 12 which directly deliver digital signals are used or, conversely, a filter 18 which operates in an analogue manner is used, the converters 16, 17 and 20 are not necessary.

The operation of this embodiment will be described. But first, the designations $h_1(t)$ and $h_2(t)$ will be given to the pulse responses of the microphones 11 and 12 respectively concerning the signal originating from the loudspeaker 15. The filter 18 performs processing consisting of applying, only to the one signal originating from the microphone 12, processing which can be represented by the function g(t). Furthermore, the summer 19 delivers a signal y(t) which can be written as follows:

$$y(t) = x_i(t) + g(t) * x_2(t) \quad \text{Equation 5}$$

It has been possible to show that the echo is considerably reduced if the function g(t) which defines the processing performed by the filter 18 is such that it is a solution of the following equation:

$$h_i(t) + g(t) * h_2(t) = 0 \quad \text{Equation 6}$$

The signal delivered by the microphone 11 can be written in the form:

$$x_i(t) = s(t) + h_i(t) * e(t) \quad \text{Equation 7}$$

where, as previously, s(t) is the signal received from the source S (also the useful signal), e(t) is the signal received from the loudspeaker 15 and the sign * represents the convolution operation.

As for the signal delivered by the microphone 12, this can be written:

$$x_2(t) = u(t) * s(t) + h_2(t) * e(t) \quad \text{Equation 8}$$

where u(t) is the pulse response of the microphone 12 with regard to the signal originating from the source S.

It should be noted that the mathematical modelling is more realistic than the previous one inasmuch as the latter was performed assuming that the echo signal e(t) was only delayed and attenuated, which would have been the case in a free propagation context with a loudspeaker 15 having ideal characteristics (omnidirectional, etc.). These assumptions are not formulated here.

It can be shown that, in view of the equations 5 to 8 above, the signal at the output of the processing unit 13 can be written:

$$y(t) \approx [\delta(t) + g(t) * u(t)] * s(t) \quad \text{Equation 9}$$

where S(t) represents the Dirac pulse.

It may be noted that, according to this equation, the echo is nullified. More particularly, the useful signal s(t) is distorted little if g(t) * u(t). is small compared with the Dirac pulse 8(t). This is all the more the case if the echo is greater at the microphone 12 than at the microphone 11, if notably the microphone 12 is closer to the loudspeaker 15 than the microphone 11.

For solving the equation 6 above in order to determine the function g(t), either non-adaptive techniques like the so-called mean square technique, or an adaptive algorithm for processing which adapts over time, can be used.

It has, however, been possible to show that fixed processing can prove sufficient in the majority of applications, which has the advantage of constituting an economic solution.

The following procedure can therefore be carried out:

1) measurements are made of the pulse response of the microphones 11 and 12 to a signal emitted by the loudspeaker 15, in the geometric configuration of the terminal 10. The aim of this operation is to subsequently calculate the pulse responses $h_1(t)$ and $h_2(t)$.

2) the above equation is then solved by a deconvolution method in order to determine the function g(t), which is implemented in the unit 14.

Figure 3:
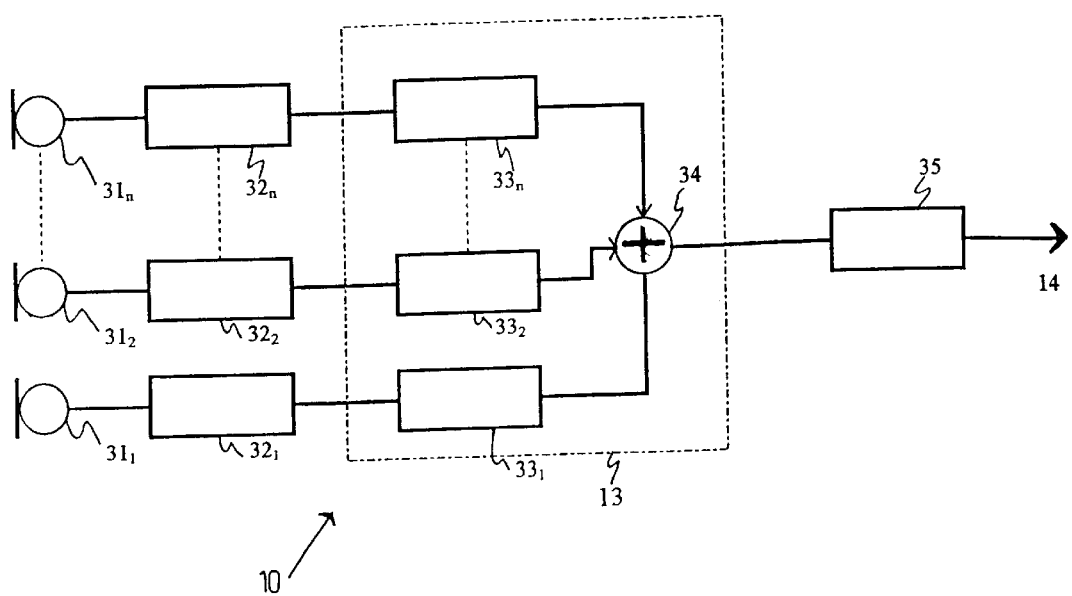
FIG. 3 is another block diagram of a sound pick-up and reproduction system according to the present invention, in a second embodiment of the filtering function.

FIG. 3 depicts another embodiment of a pick-up 10 of a pick-up and reproduction system according to the present invention. In this embodiment, the device 30 has n microphones $31_1$ to $31_n$. respectively connected to analog digital converters $32_1$ to $32_n$. The respective outputs of the converters $32_1$ to $32_n$ are respectively connected to the inputs of filters $33_1$ to $33_n$. whose outputs are connected to inputs of a summer 34 itself connected to the input of a digital/analog converter 35. The output of this converter 35 is connected to the input of a telephone unit 14 (identical to that of the first embodiment), an output of which is connected to a loudspeaker 15.

The microphones $31_1$ to $31_n$ are at different distances from the loudspeaker 15 and, advantageously, in order to take into account the fact that the loudspeaker 15 is not necessarily ideal, notably omnidirectional, are placed around the loudspeaker 15.

It should be understood that, if digital microphones are used or, conversely, if analog filters are used, the converters 322 to 32n. and 35 are not necessary.

The pulse response, to the signals delivered by the loudspeaker 36, of each microphone $31_1$, is $h_i(t)$ (i varying from 1 to n) and is either predetermined by the geometry (delay, attenuation), or measured once and for all, or estimated by an adaptive algorithm.

If the designation $g_i(t)$ is given to the function corresponding to the pulse response of each filter $33_i$ (i varying from 1 to n), this must be a solution of the following equation:

$$\sum_i [h_i(t) * g_i(t)] \approx 0 \qquad \text{Equation 10}$$

According to a preferential embodiment, after the fashion of the first embodiment depicted in FIG. 2, one of the filters, for example the filter $33_j$, is of length 1 so that it amounts to a multiplication. This makes it possible to save a filter, and therefore reduce the computational load.

In a simplified embodiment with a number of sensors, the said processing unit 13 implements a combination of the signals respectively originating from the sound sensors, each signal originating from a sensor being advanced by a duration corresponding to the time of propagation of the said echo signal originating from the reproduction device between the said sensor and a reference sensor, which can be chosen arbitrarily, for example, the sensor $31_1$ in FIG. 3.

Figure 4:
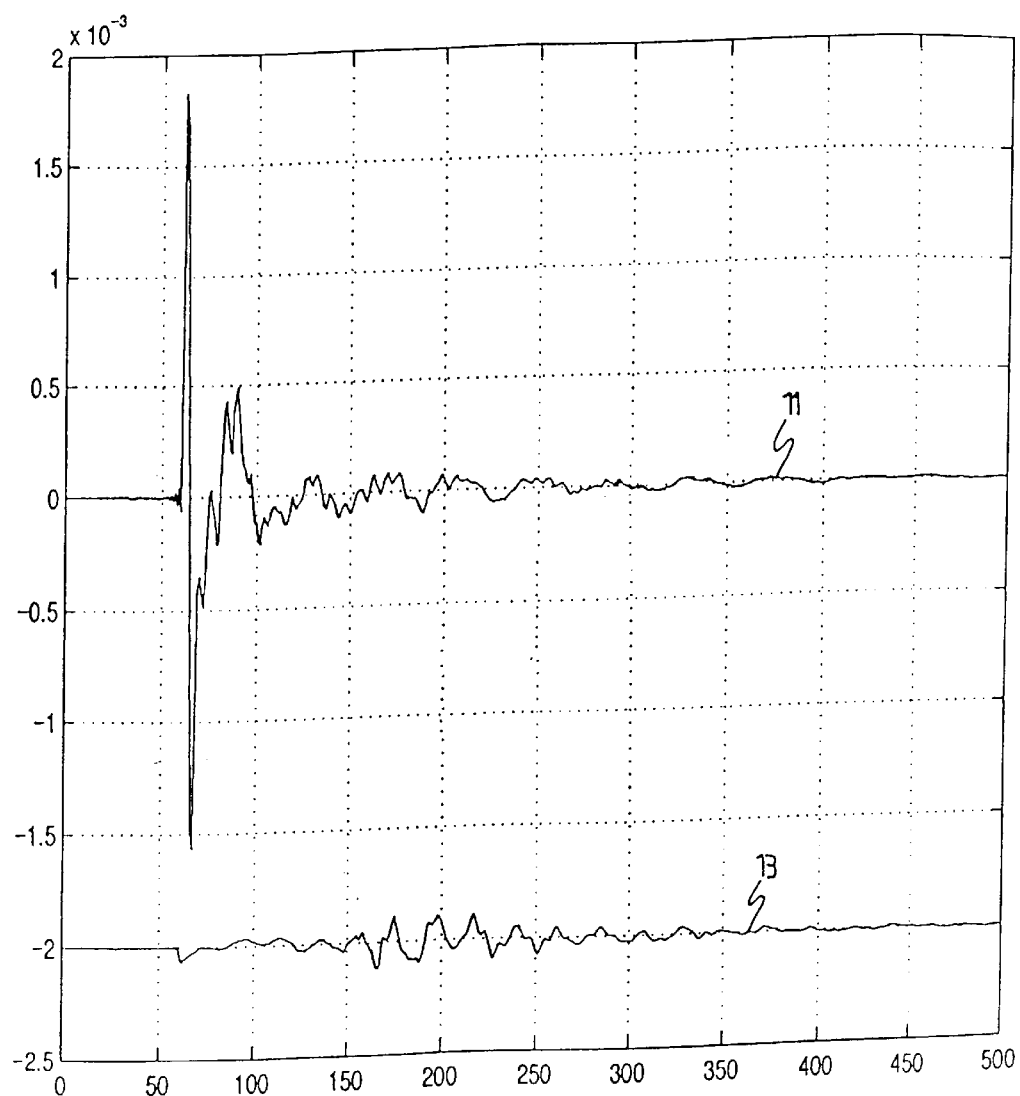
FIG. 4 is a diagram illustrating the efficiency of a sound pick-up and reproduction system according to the present invention.

The curve of FIG. 4 depicts, in the case of a device with two microphones such as that depicted in FIG. 1, the pulse response of the microphone 11 (upper curve) and the total pulse response at the end of the processing implemented by the processing unit 13 (lower curve) as a function of time, in the case of the hands-free sound pick-up of a system 100 with two microphones 11 and 12 having the above characteristics.

It should therefore be noted that the effect of the reduction of the coupling focuses on the first part of the pulse response, which corresponds to the direct loudspeaker—microphones path.

It should be noted that, in the case of non-adaptive processing, it is almost impossible to correct the whole response, the tail end of which varies with time.

In the embodiment which led to the plot of the curves of FIG. 4, the filter associated with the microphone 12 had 100 coefficients.

What is claimed is:

1. A system of reducing echoes resulting from acoustic coupling, the system comprising:
   a sound pick-up device having a signal output;
   a sound reproduction device;
   an application unit having an input connected to said signal output of said sound pickup device and having an output connected to an input of said sound reproduction device, said sound reproduction device adapted to reproduce said signal output from said sound pick-up device;
   said sound pick-up device including at least two sound sensors situated at different distances from said sound reproduction device and further including a processing unit adapted to process signals outputted from said at least two sound sensors and to output said sound pick-up device signal output to said application unit, said processing unit reducing an echoes in said sound pick-up device signal output caused by acoustic coupling between said sound pickup device and said sound reproduction device;
   said processing unit including a filter adapted to filter an output signal from each of said at least two sound sensors and a summer adapted to sum a filtered output signal from each of said at least two sound sensors;
   wherein each filter of said processing unit has a pulse response defined by a function $g_i(t)$ that is a solution calculated once and for all of the following equation:

$$\sum_i [h_i(t) * g_i(t)] \approx 0$$

for i varying from 1 to n, wherein n is a positive integer equal to the number of sensors; and
   wherein $h_i(t)$ is a previously obtained impulse response of each of said at least two sensors to signals outputted by said reproduction device is for i varying from 1 to n, and wherein* represents a convolution operation.

2. The system of claim 1, wherein each function $g_i(t)$ is determined by solving said equation with an adaptive algorithm.

3. The system of claim 1, wherein each function $g_i(t)$ is determined by solving said equation with a mean square algorithm.

4. The system of claim 1, wherein said pulse response of each of said plurality of sound sensors to said signals outputted by said sound reproduction device is determined by measuring a response of each of said plurality of sound sensors to said signals outputted by said sound reproduction device.

5. The system of claim 1, wherein said filtering of said output signal from a sound sensor disposed further away from said sound reproduction device than any other of said at least two sound sensors is defined by a multiplication function.

* * * * *